Feb. 8, 1927.
S. G. BROOKS
NAME PLATE
Filed Aug. 10, 1925
1,616,438
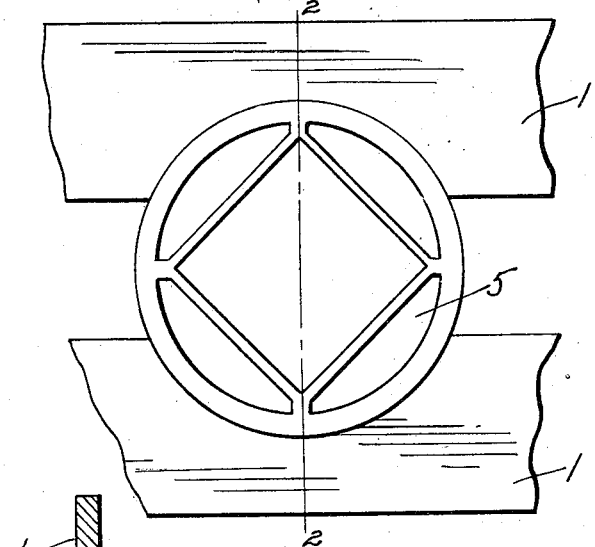
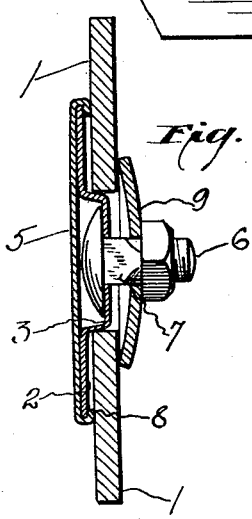
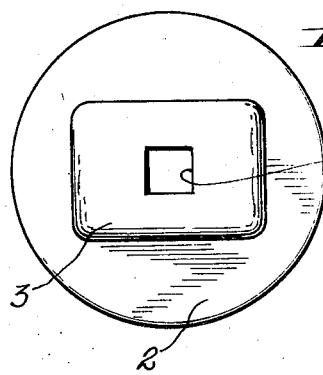
Inventor
Stanley G Brooks
Attorney Patented Feb. 8, 1927.

1,616,438

UNITED STATES PATENT OFFICE.

STANLEY G. BROOKS, OF COLUMBUS, OHIO, ASSIGNOR TO THE D. L. AULD COMPANY, OF COLUMBUS, OHIO.

NAME PLATE.

Application filed August 10, 1925. Serial No. 49,213.

The present invention is directed to improvements in name plates, and more particularly to one designed for use in connection with automobile bumpers.

The primary object of the invention is to provide a device of this character so constructed that it can be easily and quickly secured to the bumper and without breakage, and when applied the name or insignia thereon will be properly alined with the bumper and retained positively in such position.

A further object of the invention is to provide a device of this kind which is extremely simple in construction, durable, efficient in operation and one which can be manufactured at a very small cost.

With these and other objects in view, this invention resides in the novel features of construction, formation, combination and arrangement of parts to be hereinafter more fully described, claimed and illustrated in the accompanying drawing; in which:—

Figure 1 is a front view of the device.

Figure 2 is a sectional view on line 2—2 of Figure 1.

Figure 3 is a rear elevation of the back plate.

Referring to the drawing, 1 designates the vertically spaced bars of a conventional form of automobile bumper and in connection with which my invention is adaptable.

The device comprises a metallic back plate 2, preferably circular in shape, which has pressed therein a boxing 3, preferably elongated horizontally. The base of the boxing has formed therein a rectangular opening 4, the purpose of which will later appear. This boxing is adapted to engage in the space between the bars 1 of the bumper when in assembled relationship with the cover plate 5 and clamping bolt 6, the latter having a squared shank portion 7.

To assemble the device the threaded shank of the bolt 6 is passed through the opening 4 of the back plate, whereupon the shank 7 thereof will rest in said opening and prevents relative rotation of the plate and bolt. The cover plate 5 is then placed upon the back plate and its peripheral flange 8 crimped into tight engagement therewith in any approved manner, thereby firmly securing them together. During this crimping operation care is taken to assure that the name or insignia upon the cover plate is positioned in proper alinement with the horizontal axis of the boxing 3 so that when the device is in place upon the bumper the name or insignia thereon will be in proper line with the bars.

When in use the boxing is disposed between the bars 1 with its longitudinal sides in intimate contact with the opposed edges thereof, thereby preventing rotation of the device. A metal disk 9 is engaged upon the bolt 6 and rests against the inner sides of the bars 1, after which the clamping nut 10 is applied to the bolt and manipulated to tightly draw the plate against the bars to hold the boxing therebetween, the inherent resiliency of the disk aiding in holding the device firmly in place. Owing to the presence of the squared shank 7 rotation of the bolt is prevented as the nut is applied thereto. If desired the shank 7 may be dispensed with and the head of the bolt formed to fit snugly within the boxing to prevent rotation of the bolt, as will be obvious.

The plate 5 is preferably formed from nickel silver, a comparatively expensive metal, which is especially adapted for decoration and embossing, whereas the back plate 2 is formed from sheet steel capable of standing considerable strain in order that the device can be tightly clamped upon the bumper without breakage.

What is claimed is:—

The combination with a bumper including spaced bars, of a name plate comprising a sheet metal back plate having an open sided boxing pressed therein, a bolt having its head intimately engaged with the base of the boxing, said bolt serving to secure the back plate to the bumper with certain walls of the boxing engaged with the opposed bars thereof, a metal cover plate covering the front face of the back plate and open side of the boxing to confine the bolt head in the boxing in a plane with the bars, the periphery of the cover plate being secured to the periphery of the back plate.

In testimony whereof I affix my signature.

STANLEY G. BROOKS.